United States Patent [19]
Anderson

[11] Patent Number: 5,438,638
[45] Date of Patent: Aug. 1, 1995

[54] ELECTRICALLY CONTROLLED MECHANICAL OPTICAL SWITCH

[75] Inventor: Duwayne R. Anderson, Redmond, Oreg.

[73] Assignee: Tektronix, Inc., Wilsonville, Oreg.

[21] Appl. No.: 223,298

[22] Filed: Apr. 5, 1994

[51] Int. Cl.⁶ .............................................. G02B 6/26
[52] U.S. Cl. ...................................... 385/16; 385/67; 385/20
[58] Field of Search .................................. 385/15–21, 385/25, 26, 67, 65

[56] References Cited

U.S. PATENT DOCUMENTS

| | | | |
|---|---|---|---|
| 3,800,388 | 4/1974 | Bövner et al. | 385/67 |
| 4,239,333 | 12/1980 | Dakss et al. | 385/67 |
| 4,401,365 | 8/1983 | Mizokawa et al. | 385/20 |
| 4,896,935 | 1/1990 | Lee | 350/96.20 |
| 4,953,932 | 9/1990 | Mihich | 385/20 |
| 4,955,976 | 8/1990 | Freeman et al. | 385/55 |
| 5,031,994 | 7/1991 | Emmons | 350/96.20 |
| 5,037,617 | 8/1991 | Roberts et al. | 385/16 |

FOREIGN PATENT DOCUMENTS 2-146510  6/1990  Japan ..................................... 385/67

Primary Examiner—Rodney B. Bovernick
Assistant Examiner—John Ngo
Attorney, Agent, or Firm—William K. Bucher

[57] ABSTRACT

An M × N mechanical optical switch has opposing input and output optical fiber bundles disposed within offset ferrules. Each ferrule is mounted in three-point kinematically correct V-groove holder allowing the optical fibers in each optical fiber bundle to traverse on a closed curve path during the rotation of the respective ferrules. The closed curve paths of each optical fiber in one of the optical fiber bundles intersect at least one of the closed curve paths of the optical fiber in the opposing optical fiber bundles. The intersection points of two opposing closed curve paths establish the optimum positioning locations for two opposing fibers. Offsetting the axes of rotation of the opposing optical fiber bundles and mounting the bundles in a three-point kinematically correct holder produces a mechanical optical switch having superior cycle-to-cycle repeatability, long term repeatability, and absolute alignment using loosely toleranced components.

69 Claims, 10 Drawing Sheets

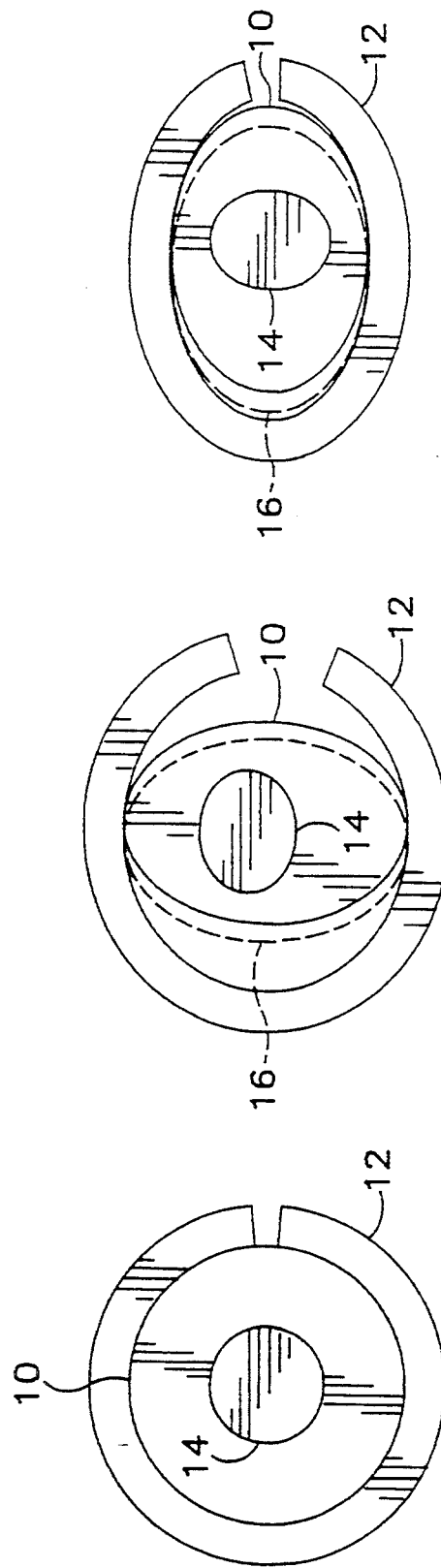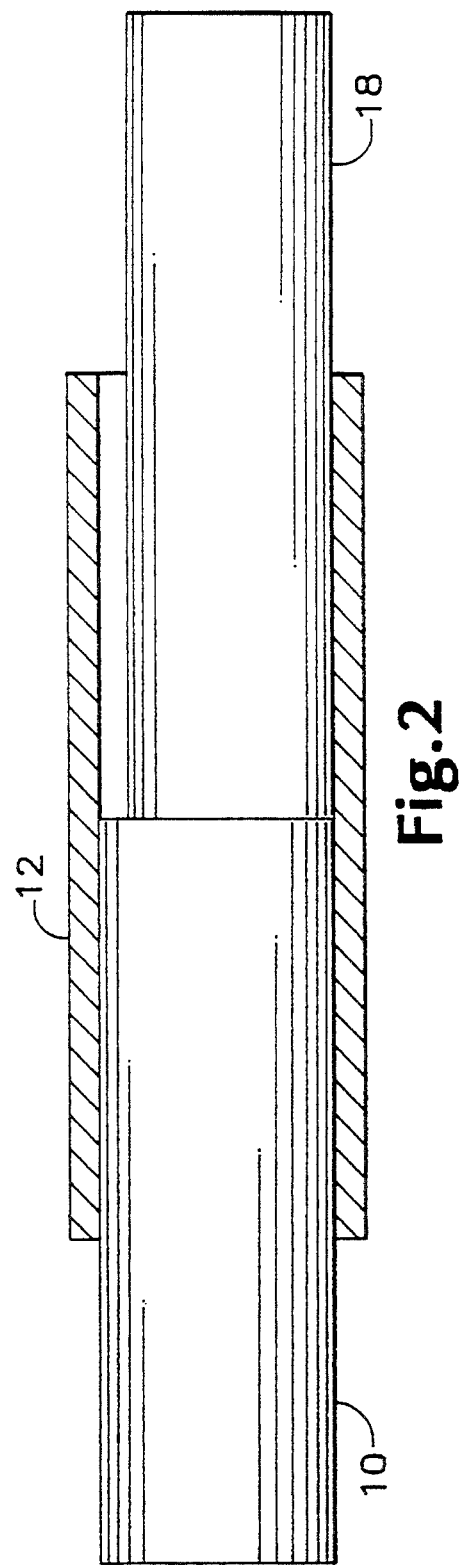

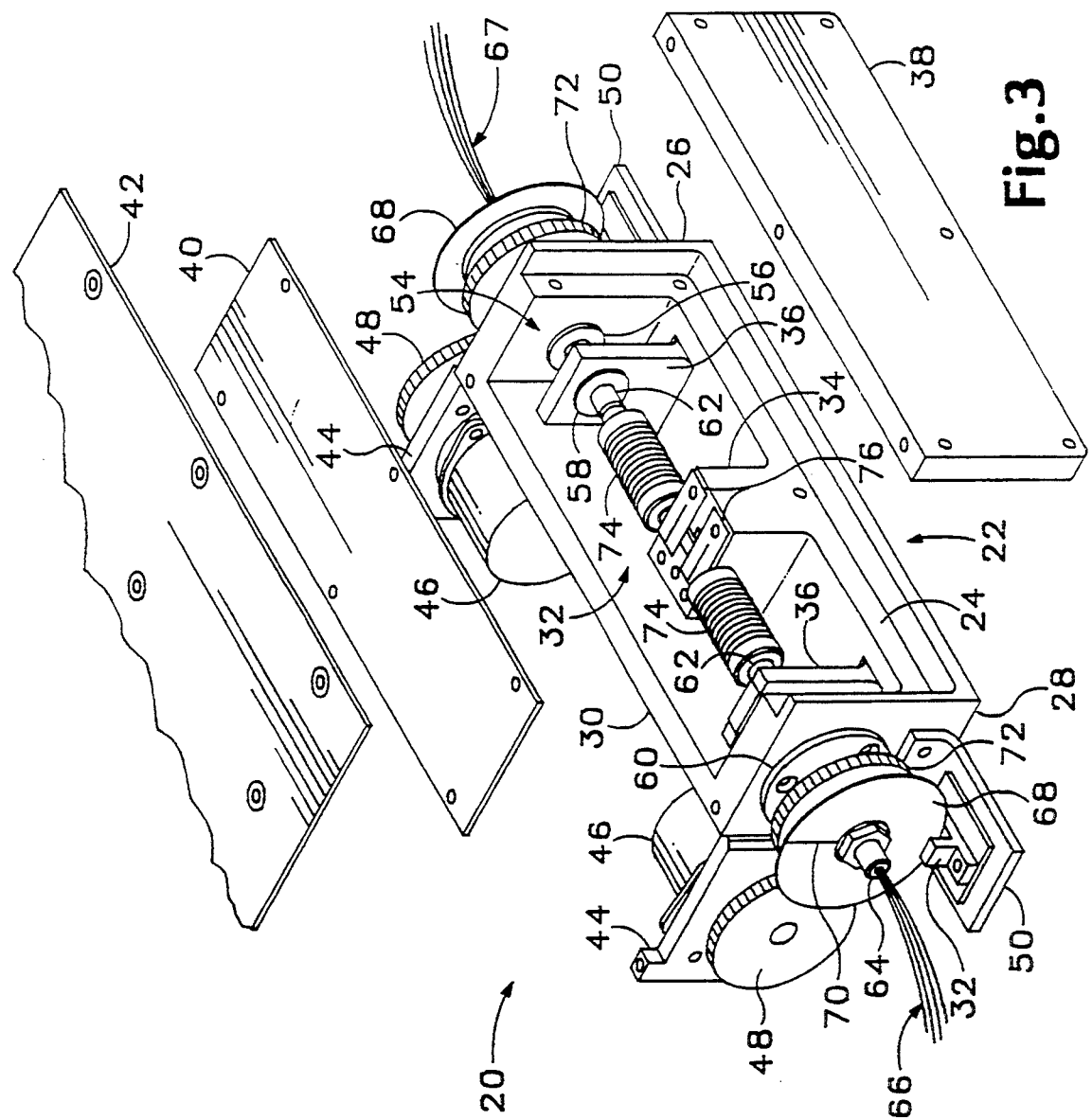

ELECTRICALLY CONTROLLED MECHANICAL OPTICAL SWITCH

BACKGROUND OF THE INVENTION

The present invention relates generally to optical switches and more specifically to a mechanical optical switch for rotatably coupling an optical fiber of a first optical fiber array with a second optical fiber of an opposing optical fiber array.

There are generally two types of optical switches in use today: electronic optical switches and mechanical optical switches. Electronic optical switches may be characterized as having no moving parts and perform the switching function, for example, by acoustically or electrically diverting the light passing through the switch.

Mechanical optical switches, on the other hand, physically move optical fiber elements to produce the switching function. Generally the physical movement of the optical fibers in mechanical optical switches is either transversal or rotational. One family of mechanical optical switches uses focusing elements, such as lenses or the like, to focus the light from one fiber to another. The use of such elements increases the translational tolerances of the switch but substantially decreases its angular tolerances and its cost. The other family of mechanical optical switches directly couple the light from one optical fiber to the other. The optical fibers are positioned in opposing relationship with the end faces of the optical fibers in substantially abutting relationship with each other. While this design eliminates the focusing elements and angular tolerances, it substantially decreases the translational tolerance of the switch.

U.S. Pat. No. 4,401,365 describes a rotary-type optical switch in which a pair of opposing optical transmission path mounting members are disposed on the same rotational axis. One mounting member may be fixedly secured in a casing while the other member rotates on a central shaft. Alternately, the shaft may be fixed with one of the mounting members rotating about the shaft. The shaft or the mounting member is directly connected to a motor so that one mounting member is rotatable with respect to the other as the shaft or mounting member is rotated by the motor. The mounting members have respective plane surfaces which are closely opposite each other. Optical fibers are secured in each mounting member such that the end faces of the optical fibers in each mounting member are concentric about the rotational axis of the mounting member and lie on respective phantom circles having the same radii.

U.S. Pat. No. 5,037,176 describes another rotary-type optical switch that includes first and second identical arrays of optical fibers held in axial alignment and relatively rotatable about an axis of rotation to effect optical coupling and decoupling of fibers in the opposing arrays. The optical switch has cylindrical switch bodies that receive the first and second identical arrays of optical fibers. The switch bodies are maintained in coaxial alignment by means of a split sleeve coupler. A tube surrounds the sleeve containing the fiber arrays and O-rings may be disposed between the sleeve and the tube to permit an index matching fluid to be retained within the switch to prevent back reflections. The optical switch described in the "176 patent is incorporated into an optical switch assembly described in U.S. Pat. No. 5,031,994.

A critical factor in mechanical fiber optical switches (MFOS) is the precise alignment of the opposing optical fibers in the switch. Currently, this requires the components of the switch to be made to very precise tolerances along with exacting manufacturing processes. As will be described below, current MFOS fall short in cycle-to-cycle repeatability, long-term repeatability and absolute alignment of the opposing optical fibers.

Mechanical fiber optic switches have unique bearing requirements that are not found in other types of applications. These special requirements need to be examined to understand why current MFOS do not provide the optimum alignment between switching fibers. The alignment tolerances for light coupling between single-mode optical fibers is well known and need not be discussed in detail here. Assuming no longitudinal or tilt misalignment and the input and output fibers are identical, the fractional coupling transmission for optical fibers with lateral misalignment is $$T = \exp\left(-\frac{x^2}{w^2}\right) \quad [1]$$

where x is the lateral offset and w is the $1/e^2$ radius of the irradiance pattern of the fundamental mode of the optical fiber. The derivative of equation [1] is taken to obtain the change in loss for a given change in coupling efficiency.

$$\Delta T = -\frac{2x}{w^2} \cdot \Delta x \cdot \exp\left(-\frac{x^2}{w^2}\right) \quad [2]$$

Equation [2] can be rearranged to solve for x as a function of the lateral offset, radius of the fundamental fiber mode, and the change in loss. The result is $$\Delta x = -\frac{w^2}{2x} \cdot \Delta T \cdot \exp\left(\frac{-x^2}{w^2}\right) \quad [3]$$

Using the above equations and assuming a transmission efficiency of the switch must be repeatable within 0.01 dB on a cycle-to-cycle basis with a nominal transmission loss of less than 0.50 dB, maximum alignment tolerance values can be calculated for cycle-to-cycle repeatability, long-term repeatability, and absolute alignment. Since the $1/e^2$ radius of the fundamental mode in standard single-mode fiber is roughly 5.5 microns, the nominal loss of 0.50 dB corresponds to a lateral misalignment of approximately 1.7 microns (according to equation [1]). According to equation [3], if the transmission changes less than 0.01 dB on a cycle-to-cycle basis, the misalignment of 1.7 microns must be repeated to within 0.017 microns, or 17 nanometers. The numerical tolerance are calculated for an optical fiber having a mode field diameter of 5.5 microns. Other optical fiber may, for example, have mode filed diameters, such as 5.1 or 5.6 microns. Different mode field diameters will change the numerical tolerances slightly but not substantially.

The 0.017 micron requirement is for cycle-to-cycle repeatability only. There is also a long term repeatability requirement where the transmission efficiency must not change by more than 0.10 dB over 100,000 cycles. Applying the same analysis using equations [1] and [3], the position accuracy of the opposing fibers in the switch must repeat to within 0.164 microns on a long-term basis or about ¼th of a wavelength of visible light.

Referring now to FIG. 1A, there is shown an end view of a cylindrical shaft 10 inside a split sleeve 12. In an ideal world, the shaft 10 is perfectly round and has exactly the same outside diameter as the equally perfectly round inside diameter of the split sleeve 12 with the shaft 10 touching the split sleeve 12 along its entire circumference. A bore 14 formed in the shaft 10 for holding the optical fibers is perfectly round and concentric with the shaft 10 and split sleeve 12. FIGS. 1B and 1C illustrate on an exaggerated scale the type of shaft 10, split sleeve 12, and bore 14 that can be expected in the real, imperfect world. None of the elements 10, 12, or 14 will be perfectly round. Instead, shaft 10 and split sleeve 12 will approximate a cylindrical surface, with local regions where the radius is slightly too large, or too small. This is shown in the figures as an ellipse. As can be seen from the figures, the points of contact between the split sleeve 12 and the shaft 10 will change as one or the other rotates, or if any slight lateral torque, as shown by dashed ellipse 16, is applied to the shaft 10, so that fibers (not shown) in the shaft will not trace out concentric circles. Notice also that, at the point of contact, the surface of the split sleeve 12 is parallel to the surface of the shaft 10. The only force preventing the shaft 10 from slipping in the split sleeve 12 is the frictional force between the two surfaces. The frictional force is incapable of reliably providing the kind of cycle-to-cycle or long-term repeatability that is needed. Furthermore, there is the paradox of lubrication. In order to extend the life of the bearing surfaces it is desirable to lubricate them, but lubrication reduces the frictional forces between the two surfaces, resulting in more wobble.

FIGS. 1B and 1C illustrate an additional problem. The fibers align themselves to the shaft 10 via the bore 14 drilled along the axis of the shaft 10, and this bore 14 has its own set of tolerances. Specifically, the bore 14 will be slightly out of concentricity with the outside surface of the shaft 10, and like the outside surface of the shaft 10, it will be slightly out-of-round.

There are multiple dimensional tolerances that must be tightly specified if the input and output fibers of the switch are to rotate on identical circles that are precisely concentric. The design parameters that must be firmly controlled are:

Roundness of the input shaft outside diameter.
Roundness of the output shaft outside diameter.
Roundness of the input shaft inside diameter.
Roundness of the output shaft inside diameter.
Concentricity of the input shaft inside and outside diameters.
Concentricity of the output shaft inside and outside diameters.
Outside diameter of the input shaft.
Inside diameter of the input shaft.
Outside diameter of the output shaft.
Inside diameter of the output shaft.
Inside diameter of the split sleeve.
Roundness of the split sleeve inside diameter.
Diameters of the input and output fibers.
Concentricity of the input and output fibers.

To maintain an insertion loss of less than 0.50 dB, all of these tolerances must add up to less than 1.87 microns of misalignment. This is an extremely difficult task, and to accomplish it the individual components (input fibers, output fibers, input shaft, output shaft, and split sleeve) must have several dimensional tolerances that are sub-micron. This is certainly not conducive for minimizing the costs of individual components, and is daunting in terms of manufacturability.

Another issue in mechanical fiber optic switch design is switch repeatability. Referring to FIG. 2, there is shown a side view of the shaft 10 and sleeve 12 of FIGS. 1B and 1C with the sleeve 12 being sectioned. The split sleeve 12 works with shaft 10 that is slightly larger than the inside diameter of the unexpanded sleeve 12. Because the sleeve 12 is split, it can expand slightly to allow the shaft 10 (a ferrule containing the optical fibers) to fit inside with no diametrical clearance. Diametrical clearance is unsatisfactory because it results in slop within the bearing, and there is needed less than 0.017 microns of misalignment non-repeatability between the opposing fibers to meet the cycle-to-cycle repeatability specifications.

As has been discussed with FIGS. 1B and 1C, the out of roundness on the part of the shaft 10 and the sleeve 12 will cause the fiber to move on curves that are not circles. However, barring wear in the bearing, out-of-roundness should not result in slop or lack of repeatability. Out-of-roundness will affect the total coupling efficiency, but not the repeatability. FIG. 2 shows the shaft 10 having an interference fit with the sleeve 12. However, a second shaft 18 will most likely have a slightly different diameter owing to the inevitable tolerances in manufacturing. If the second shaft 18 has a larger diameter than the first shaft 10, then it will expand the split sleeve 12 a little bit, resulting in an interference fit for the second shaft 18 but not the first shaft 10. Now the first shaft 10 can slop in the split sleeve 12. If the second shaft 18 has a smaller diameter than the first, then it will wobble. No matter what happens one of the two shafts 10 or 18 will wobble within the split sleeve 12. To meet the cycle-to-cycle repeatability requirement this wobble must be less that 0.017 microns, so the diameter of the two shafts 10 and 18 must be equal to about 0.008 microns. This specification would require extremely expensive parts. However, for all practical purposes, meeting such a specification would be impossible to do.

What is needed is an inexpensive mechanical fiber optic switch that meets the cycle-to-cycle repeatability, long-term repeatability, and absolute misalignment specifications. Such a switch should use loosely toleranced commercially available off-the-shelf components and be easy to assemble without requiring fine alignment of the switch components and fibers. In addition, the switch should have a fiber mounting system that has minimum bearing wear and is insensitive to dimensional differences of the components. Further, the switch should have good stability over temperature.

SUMMARY OF THE INVENTION

Accordingly, the present invention is to an optical switch having at least a first optical transmission path positioned to move on a first closed curve and at least a second optical transmission path positioned to move on a second closed curve. The first and second optical transmission paths are in opposing relationship, with the closed curves of the optical transmission paths being laterally offset from each other for establishing intersecting points on the closed curves. Means are provided for axially aligning the first and second optical transmission paths at one of the intersecting points on the closed curves.

In a further aspect of the invention the optical switch has independent and offset rotational axes about which the respective first and second optical transmission paths rotate on respective closed curves. The first and second optical transmission paths can include a plurality of optical transmission paths with the plurality of first optical transmission paths rotating about one of the independent and offset rotational axes and the second plurality of optical transmission paths rotating about the other rotational axes. In the preferred embodiment the optical transmission paths are optical fibers.

In still a further aspect of the invention the optical switch includes mounting members for holding the respective first and second optical transmission paths with each mounting member having a rotational axis axially aligned with one of the independent and offset rotational axes and the transmission paths being positioned off of the rotational axes of the mounting members. The mounting members are positioned in individual, kinematically designed offset holder assemblies. In the preferred embodiment, the kinematic mounts are V-groove structure having an apex and angularly extending sidewalls forming a V-shaped cavity for receiving the respective mounting members. A spring clamp is positioned over the V-shaped cavity for securing the mounting members in a three-point cavity. The V-groove structures are formed from a material having substantially the same or greater hardness as the mounting members or have inserts secured to the sidewalls of the V-groove structures that have substantially the same or greater hardness as the mounting members. The mounting members and the V-groove structures are preferably a borosilicate or ceramic material.

In the preferred embodiment, the mounting members are first and second ferrules with each ferrule having a centrally disposed longitudinal axis about which the ferrule rotate, an outside diameter and a central bore for receiving the respective first and second optical fibers. The optical fibers may completely fill the ferrules with any one optical fiber lying substantially on the rotational axes of the ferrules not moving on a closed curve.

The axial aligning means includes means for selectively rotating the first and second optical transmission paths relative to each other about their respective independent and offset rotational axis. Means are provided for storing angular coordinates representative of the intersecting points of the first and second closed curves of the respective first and second optical transmission paths. The rotating means include first and second stepper motors or DC motors with high resolution encoders responsive to the angular coordinates of one of the intersecting points of the first and second closed curves for coupling rotational movement to the respective first and second optical transmission paths. First spur gears mounted to the respective stepper or DC motors transmit rotation movement to rotatable shafts via second spur gears mounted on the rotatable shafts. The rotatable shafts are coupled to the respective optical transmission path mounting members. The rotatable shafts include a first shaft element having a central bore for receiving the respective first and second optical transmission paths and a flexible drive shaft coupling for connecting the first drive shaft element to the respective optical transmission path mounting members. Also included are first and second bearings having a central bore for receiving the first shaft element of the rotatable drive shafts. Alternately, the rotating means may be first and second manually rotatable reduction gear assemblies coupled to transmit rotational movement to the respective first and second optical transmission paths.

The objects, advantages and novel features of the present invention are apparent from the following detailed description when read in conjunction with appended claims and attached drawings.

BRIEF DESCRIPTION OF THE DRAWINGS

FIG. 1A-1C are respective idealized and real world representations of a prior art coaxial alignment scheme for a mechanical fiber optic switch.

FIG. 2 is a side view of the prior art coaxial alignment scheme for a mechanical fiber optic switch.

FIG. 3 is an exploded perspective view of the mechanical optical switch according to the present invention.

DETAILED DESCRIPTION OF THE PREFERRED EMBODIMENT

Figure 4:
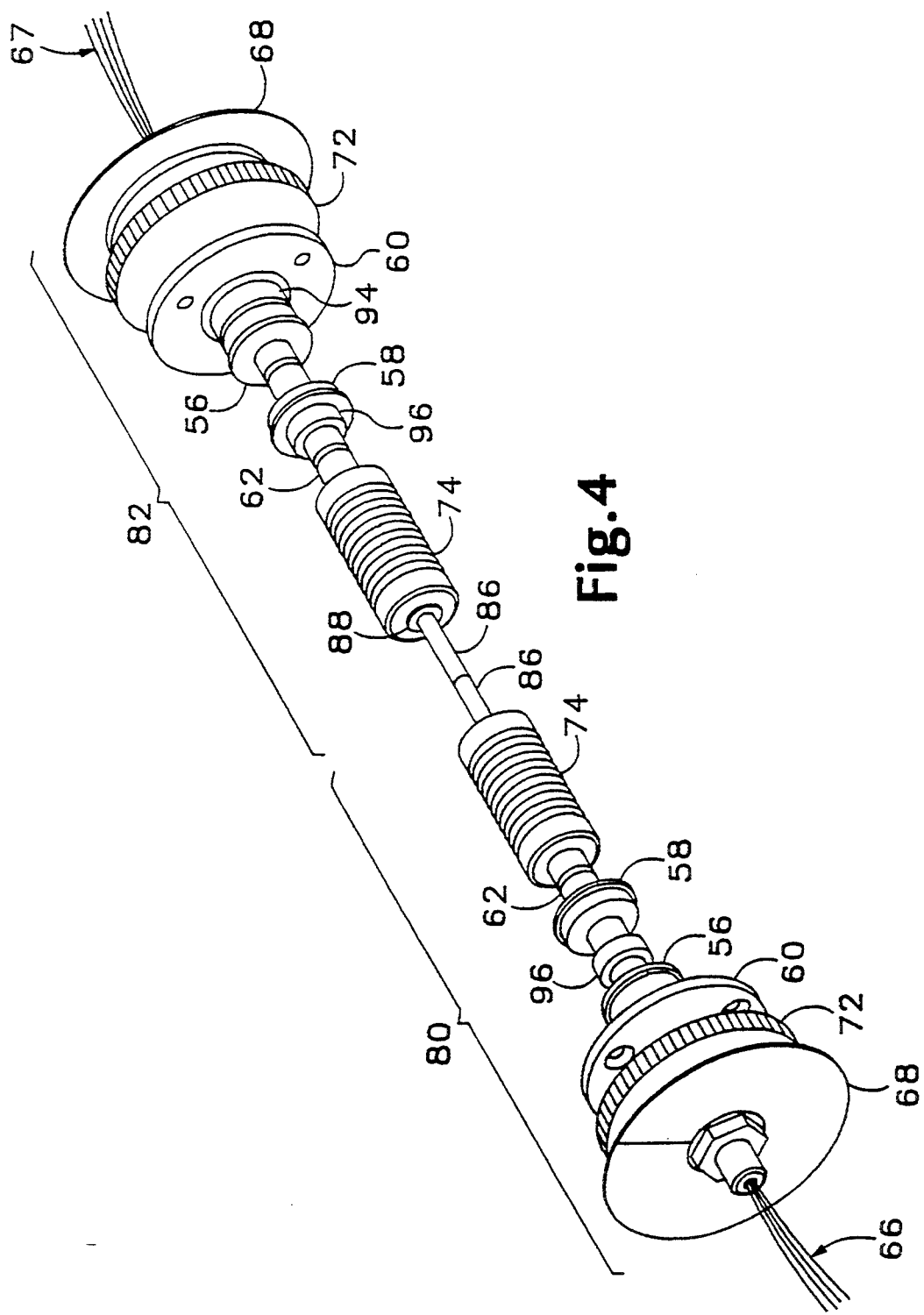
FIG. 4 is a perspective view of the ferrule drive assembly in the mechanical optical switch according to the present invention.

Referring to FIG. 3, there is shown an exploded perspective view of the mechanical optical switch 20 according to the present invention. One use for switch 20 is in remote fiber test systems. In such a system, the switch 20 connects a remote test unit, such as an optical time domain reflectometer, optical power meter, or the like, to various optical fibers in order to evaluate them. Another use is in conjunction with central office telephone switches for redirecting phone signals to a different optical fiber line when the original line is damaged.

Switch 20 has a housing 22 having a base 24, end walls 26 and 28, and sidewall 30 forming a partial cavity 32. Within the cavity 32 is a central pedestal 34 and bearing supports 36 rising from the base 24. The bearing supports 36 are disposed between the central pedestal 34 and the end walls 26 and 28. A removable sidewall 38 and top plate 40 are provided for enclosing the housing cavity 32. Mounted on top of the housing 22 is a circuit board 42 containing the electronic circuitry for the switch 20. Secured to the outside of the housing 22 adjacent to the end walls 26 and 28 are stepper motor brackets 44. Secured to each bracket 44 is a stepper motor 46. Extending from each stepper motor 46 is a shaft on which is secured a toothed spur gear 48. Mounted on the outside of each end wall 26 and 28 is a photodetector bracket 50. Mounted on each bracket is a photodetector 52 having a light emitting element and a light sensitive element.

A bore 54 is formed in each of the end walls 26 and 28. Bearings 56 are press fit into each bore 54 from the cavity 32 side of the end walls 26 and 28. Bearings 58 are also press fit into the bearing supports 36. Flange shaft seals (not visible in this figure) are mounted within each bore 54 from the outside of the cavity 32 and held in place by seal plates 60 mounted on the outside of the end walls 26 and 28. Extending through the seal plates 60, the flange shaft seals, and bearings 56 and 58 are rotatable drive shafts 62 having a central bore 64 for receiving input and output optical fibers 66 and 67. Mounted on each drive shaft 62 are slotted wheels 68 having a slit 70 formed therein. A portion of each slotted wheel 68 is positioned within a gap between the light emitting element and the light sensitive element of the photodetector 52. Also mounted to the rotatable drive shafts 62 are drive shaft spur gears 72 which engages the respective toothed spur gears 48 of the stepper motor 46. Secured to one end of each of the drive shafts 62 are flexible drive shaft couplings 74. Within the other end of the flexible couplings 74 are mounting members (not visible in this drawing) that hold the optical fibers 66 and 67 of the switch 20. Spring clamps 76 are mounted on the central pedestal 34 for hold the mounting members within offset V-grooves formed in the pedestal 34. The spring clamps 76 and the offset V-grooves form the holder assemblies for the mounting members, which will be described in greater detail below. The enclosed cavity 32 may be filled with an appropriate index matching fluid to reduce back reflections of the input light passing between the input fiber and output fiber. The index matching fluid also acts as a lubricant for the V-grooves and the bearings 58.

The housing 22, removable sidewall 38, and top plate 40 may be made of such materials as milled aluminum, stainless steel, or molded plastic. In the current design, these parts are milled aluminum. The rotating means in the form of the stepper motor 46 needs to achieve 0.14 degrees of rotational accuracy, be inexpensive, use relative little power and be small. An example of such a stepper motor 46 is manufactured and sold by HSI, Inc, Waterbury, Conn. under part number HSA33700. This particular stepper motor has an angular control specification to 0.09 degrees. Since the backlash is large for this particular motor a home position indicator is provided with the photodetector 52 and the slotted wheel 68. The photodetector 52 may be any commonly available device, such as the Sharp GP1L01F manufactured and sold by Sharp Corp., Camus, Wash. that generates an electrical signal when light passes from the light emitting element to the light receiving element. The slotted wheel 68 may be made of any appropriate material having adequate rigidity and capable of having a narrow slot formed in it. In the preferred embodiment, the slotted wheel 68 is formed from a 1 mil polycarbonate film having a 0.001 inch slot 70 formed therein. The film is laminated onto an aluminum stiffening plate. As an alternative to the steppers motors 46, Dc motors having high resolution encoders may be used. The ferrule drive shaft 62 may be formed of any appropriate material that is substantially rigid and resistant to wear. In the preferred embodiment, the rotatable drive shaft 62 is a stainless steel rod having an outside diameter of one-forth of an inch. The central bore 64 has a diameter of one-tenth of an inch.

Referring to FIG. 4, there is shown a perspective view of the mounting member drive system for the mechanical optical switch 20. The drive system includes input and output sections 80 and 82 which are essentially the same with the exception of the positioning of the optical fibers within the mounting member, which will be described in greater detail below in relation to ferrules 86. The elements of the output section 82 is essentially the same as the input section 80. The output section 82 has the rotatable drive shaft 62 on which are mounted the slotted wheel 68 and the drive shaft spur gear 72. The drive shaft 62 passes through seal plate 60, the flange shaft seal 94, and bearings 56 and 58. Attached to one end of the drive shaft 62 is the flexible drive shaft coupling 74. The flexible coupling 74 is provided to reduce the lateral torque being applied to the ferrules 86 during rotational movement, which would cause misalignment of the optical fibers in the switch 20. An appropriate flexible coupling may be obtained from Servometer, Ceder Grove, N.J. under part number FC-9. Secured to the opposite end of the flexible coupling 74 is ferrule 86 contained in a ferrule assembly 88. Within each ferrule 86 are secured the optical fibers 66 and 67 of the switch 20, which are in intimate opposing relationship to each other. To maintain this relationship, clamp collars 96 are mounted on the ferrule drive shafts 62 on either side of the inner bearings 58.

Figure 5:
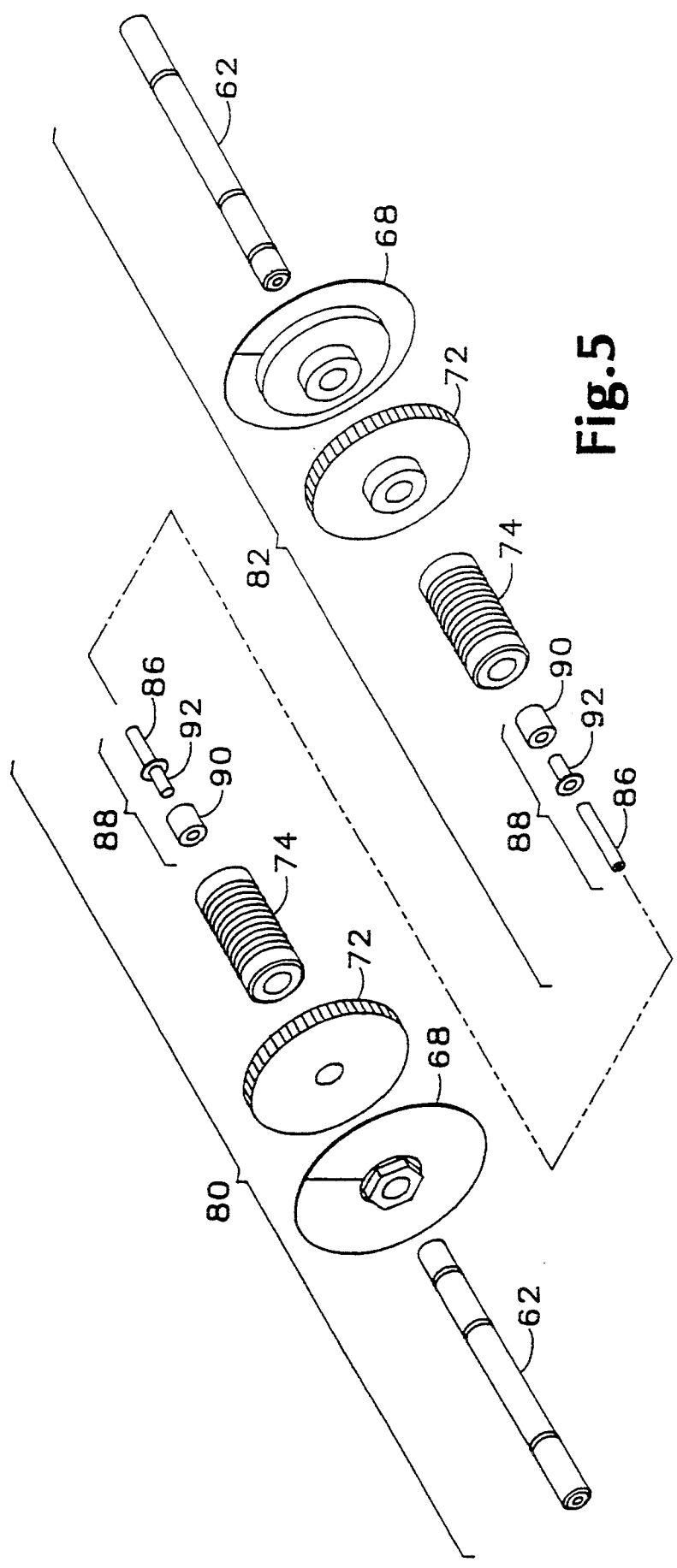
FIG. 5 is an exploded perspective view of the ferrule drive assembly in the mechanical optical switch according to the present invention.

Referring to FIG. 5, there is shown an exploded perspective view of the mounting member drive assembly. Elements in this figure are numbered the same as like elements in the previous figures. The ferrule assembly 88 consisting of a ferrule coupler 90 and the ferrule 86. In the preferred embodiment the ferrule coupler 90 is made of stainless steel but other suitable materials may be used. Alternately, a ferrule strain relief 92 may be secured within the ferrule coupler 90. A representative ferrule strain relief 90 may be purchases from Stimpson Co., Inc., Bayport, N.Y., under part number A3215. The ferrule 86 is secured in the ferrule coupler 90. The ferrule 86 is formed of a borosilicate industrial optics glass. A representative type of ferrule is the HC type manufactured and sold by Nippon Electric Glass, Des Plaines, Ill. This particular type of ferrule has an outside diameter tolerance of ±5 microns, an out of roundness specification of ±1 micron, and inside diameter tolerance of ±2 microns. As was previously described, using a ferrule with these tolerances in prior art optical switches would not provide the cycle-to-cycle repeatability, long,term repeatability, and absolute alignment required for a workable mechanical optical switch. However, applicant's mechanical optical switch 20 overcomes the mechanical tolerance problems of current mechanical optical switches by offsetting the ferrules 86 so as to rotate about independent axes instead of coaxially aligning and rotating the ferrules about a single axis as in the prior art.

Figure 6:
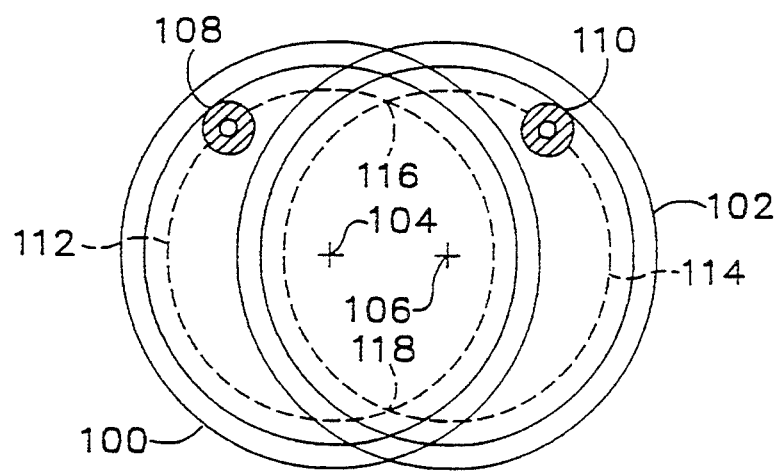
FIG. 6 is a diagrammatic representation of the offset ferrules in the mechanical optical switch according to the present invention.

Referring to FIG. 6, there is shown a representation of two opposing ferrules 100 and 102, rotating on independent axes 104 and 106, with each ferrule 100 and 102 containing an optical fiber 108 and 110 acting as an optical transmission path. In the preferred embodiment, the optical fibers are single-mode fibers having a core diameter of approximately 10 microns and an outside diameter of 125 microns. Other optical transmission paths may also be used, such as multimode optical fibers without departing from the scope of the invention. The opposing optical fibers 108 and 110 are positioned to move along closed curves 112 and 114 as the ferrules 100 and 102 are rotated. The close curves 112 and 114 intersect at points 116 and 118 on the respective curves. Assuming the curves 112 and 114 remain closed throughout the 360 degrees of rotation of the ferules 100 and 102, the intersection points 116 and 118 will be stable and will accurately represent the optimum alignment position for the two opposing fibers 108 and 110.

Figure 7A:
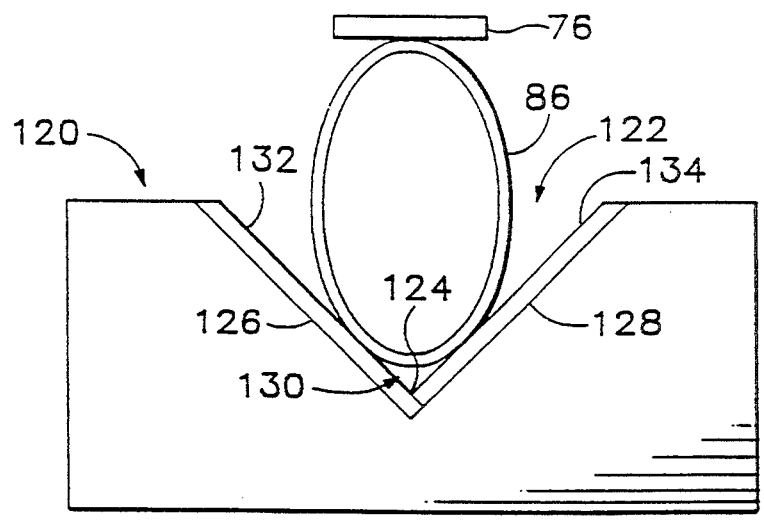
FIGS. 7A and 7B are end views of the kinematically correct holder assemblies in the mechanical optical switch according to the present invention.
Figure 7B:
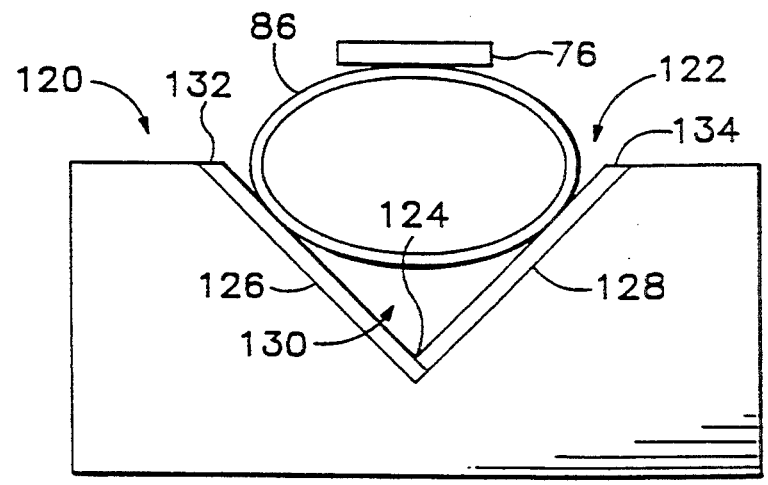

Referring to FIGS. 7A and 7B, there are shown end views of one of the two offset holder assemblies 120 formed or mounted on the pedestal 34 of the mechanical optical switch 20. Each holder assembly 120 has a V-groove structure 122 having an apex 124 and angularly extending sidewalls 126 and 128 forming a V-shaped cavity 130. Bonded to the sidewalls 126 and 128 are thin strips of wear resistant material 132 and 134, such as glass, ceramic, or the like. Configuring the holder assembly 120 in this manner allows the V-groove structure 122 to be formed from inexpensive materials, such as aluminum, plastic, or the like, while at the same time providing an extremely durable bearing. A more expensive, but possible design could use V-grooves made directly from the wear resistant material.

Ferrules 86, shown considerably out-of-round for illustrative purposes only, are respectively received in each of the V-groove cavities 130 formed on the pedestal 34. Spring clamps 76 are positioned over the cavities 130 to secure the ferrules 86 in the V-groove structures 122. The sidewalls 126 and 128 of each V-groove structure 122 provide two contact points for the ferrule 86 while the spring clamp 76 provides the third. This three-point mount is kinematically correct. The retaining surfaces, the sidewalls 126 and 128 and the spring clamp 76, are tangent to the surface of the ferrule 86, resulting in a minimum energy configuration that is very stable, even when the ferrule 86 is not perfectly round. This compares to the prior art switches where the number of contact points is unknown, and varies from switch to switch, even during rotation. The spring clamp 76 in each holder assembly 120 is easily capable of small motion, so it can accommodate thermal expansion of the ferrule 86 or any out-of-roundness without slop (random movement) of the ferrule itself. Even if the ferrule 86 is considerably out-of-round the fibers inside the ferrule will still trace out closed curves. This eliminates any wobble caused by the dimensional variations between ferrules, as exhibited in prior art mechanical optical switches. It should be noted that the practice of this invention is not limited strictly to the V-groove structure and clamp configuration and other kinematically correct holder assemblies may be used without departing from the scope of the invention.

Bearing wear is a critical problem for any mechanical optical switch 20. The bearing wear on the V-groove structure 122 occurs only along a infinitesimally thin line on each sidewall 126 and 128 surface. However, wear on the ferrule 86 occurs along its entire surface. Assuming the thickness of the material removed through wear is inversely proportional to the surface area of the bearing, the wear rates on the V-groove structure 122 should be hundreds or thousands of times greater than those of the ferrule 86. Bonding the wear resistant strips 132 and 134 to the sidewalls 126 and 128 reduces the wear on the V-groove structure 122. Additionally, control of the switch can be designed so, on the average, both ferrules 86 rotate the same number of degrees during any 100,000 cycles. This would in theory result in even wear rates for both V-groove bearings so that the ferrules 86 settle into the respective V-groove structures 122 by the same amount, thus preserving their relative alignment.

Figure 8:
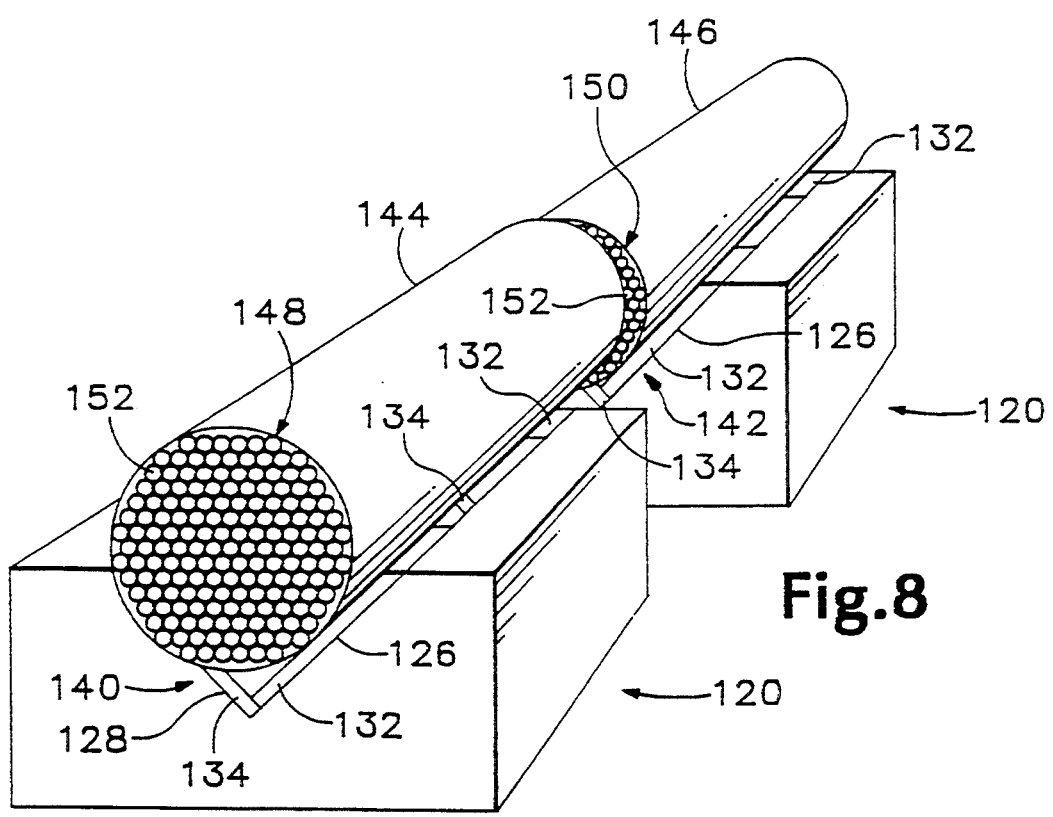
FIG. 8 is a simplified perspective of the offset input and output ferrules in the mechanical optical switch according to the present invention.

Referring to FIG. 8, there is shown a perspective view of the offset V-groove holder assemblies 120 formed on the pedestal 34 of the mechanical optical switch 20. Mounted in the V-grooves 140 and 142 are input and output ferrules 144 and 146 containing input and output optical fiber arrays 148 and 150. Each fiber array 148 and 150 may be formed of a single optical fiber 152 or multiple optical fibers. The outer walls of the ferrules 144 and 146 and the spring clamps 76 are not shown for clarity. The wear resistant strips 132 and 134 are shown in the currently preferred configuration where the separate wear resistant strips are bonded to the opposing ends of the sidewalls 126 and 128 of the V-grooves 140 forming a double ended bearing for the ferrules 144 and 146. The spring clamps 76, as shown in FIG. 3, are slotted to form first and second spring clamp members positioned over each set of wear resistant strips for securing the ferrules 144 and 146 in the V-groove cavity 130. Alternately, the wear resistant strips 132 and 134 may be configured to line the complete sides of the V-grooves 140 and the spring clamps 76 are not slotted. As is shown in the figure, the input ferrule 144 is slightly offset from the output ferrule 146. Because each ferrule 144 and 146 is highly constrained in its kinematically correct holder assembly 120, each fiber 152 of the input fiber array 148 traces out a closed curve when the input ferrule 144 rotates. These closed curves are approximately circles, but the actual shapes of the curves are not important. The curves could be ellipses, or any other closed curve. The same thing applies to the optical fibers 152 in the output fiber array 150. As was described with reference to FIG. 6, the closed curves of the optical fibers 152 in the input and output fiber arrays 148 and 150 are not concentric. That is any optical fiber 152 positioned to move on a closed curve in the input fiber array 148 will not be mirrored by any optical fiber 152 positioned to move on a closed curve in the output fiber array 150. The V-grooves 140 and 142 are deliberately offset in order to throw any input optical fiber closed curve out of concentricity with any output optical fiber closed curve.

Because the closed curves of the respective input and output optical fiber arrays 148 and 150 are not concentric, they intersect at exactly two points. It is because of this fact that perfect alignment is achieved between the optical fibers 152 of the input optical fiber array 148 and the optical fibers 152 of the output optical fiber array 150. Because there is no wobble or slop in the ferrule bearings, the kinematically correct holder assemblies 120, the curves are really closed, and because they are closed the angular coordinates of the intersection points are stable. This means that, for some angular coordinates of the input and output ferrules 144 and 146, an optical fiber 152 of the input fiber array 148 comes into perfect alignment with an optical fiber 152 of the output fiber array 150 at the intersection points. And, because the curves close, the angular coordinates are stable. They repeat over and over with extreme precision. Dynamically, if the trajectory of the system in phase space closes, then it is stable, periodic, and predictable. If the trajectory does not close, however, then the system can be chaotic, depending on the dimension of the fractal attractor.

Another important advantage is achieved by offsetting the input and output ferrules to rotate about independent and separate rotational axes. Each ferrules 144 and 146 may be loaded with any number of fibers 152. Some of the fibers 152 will be located about the edge of the inside diameter of the ferrules 144 and 146, and some will be located toward the center. By offsetting the ferrules 144 and 146, the closed curves scribed by the input fibers along the edge of the ferrule 144 can be made to intersect all of the output fibers of ferrule 146, even those that are located more toward the center. To do this, the offset between the two ferrules 144 and 146 should nominally be such that the closed curve traced out by the input fiber intersect the center of the output ferrule to within a tolerance of ½ the fiber diameter. In prior art designs, output fibers that are located near the center cannot be connected to input fiber that are on the edge. This means that an N×N switch can be built with more of its fibers concentrated toward the center than would be possible with prior art mechanical optical switches. This is an important advantage and objective of the invention because the angular tolerance required to achieve a given alignment decreases as the fibers move further from the center of the ferrule. So, when the fibers are far from the center of the ferrule, it requires more accurate angular resolution of the apparatus that rotates the ferrules. This would require, for example, the use of more expensive stepper motors 46 in the prior art designs whereas, in the present invention, less precise and therefore, less expensive stepper motors 46 can be used.

Another advantage and objective of the present invention is that the optical fibers 152 in the input and output optical fiber arrays 148 and 150 may be randomly configured in the input and output ferrules 144 and 146. That is, it is not necessary to arrange the fibers 152 in the array 148 and 150 in neat little patterns. Each fiber can follow its own closed curve. It make no difference to the operation of the switch, so long as the closed curves of all the input fibers 152 of the input fiber array 148 intersect the closed curves of all of the output fibers 152 of the output fiber array 150. Compare this design to the prior art where something is required to hold the fibers against the surface of the inside diameter of the ferrule or position the fibers on a concentric circle. Furthermore, that something must be very accurately dimensioned or the fibers will not be held tightly, and this will affect the concentricity, diameter, and roundness of the circles these fibers should travel.

An objective of the present invention is to produce a mechanical optical switch 20 that is easy to manufacture. As has been previously described, the mechanical optical switch 20 does not require precise positioning of the individual fibers 152 of the input and output fiber arrays 148 and 150 in the input and output ferrules 144 and 146 of the switch 20. The switch 20 of the present invention maybe configured as a 1×N switch having a single input port and multiple output ports or it may be configured as an N×N or N×M switch with multiple input ports and multiple output ports. In any configuration, the positioning of the optical fibers 152 is similar. In a 1×N switch, the input ferrule 144 is filled with optical fibers 152. Ultraviolet cured epoxy is added to the ferrule 144 to fill the voids between the fibers 152. Ultraviolet light is used to cure the epoxy within the ferrule 144. All but one of the optical fibers 152 are then snipped at the end of the ferrule 144 leaving a single optical fiber 152 as the optical port. The same process is used for N×N and N×M optical switches with the exception that less or no fibers 152 are snipped. Likewise, the same process is used for producing the output ports for the switch 20. The important fact here is that no precise positioning of the fibers 152 within the ferrules 144 and 146 is necessary. This substantially reduces the manufacturing costs of the switch 20.

Alternately, a plug device may be used in forming the optical ports of the switch 20. The plug is positioned in the ferrules 144 and 146 and the fibers 152 are positioned between the plug and the inside wall of the ferrules. Ultraviolet cured epoxy is used to fill the ferrules 144 and 146 with the epoxy exposed to ultraviolet light for curing. In either process, the ends of the ferrules 144 and 146 containing the fiber 152 are then ground and polished.

The input and output ferrules are then mounted in the holder assemblies 120 of the switch 20 and connected to the flexible couplings 74 of the ferrule drive system with the input and output fibers 66 and 67 (FIG. 3) passing through the central bores 64 of the ferrule drive shafts 62. It is worth noting that the assembly of the mechanical components of the switch is independent of the location of the optical fibers 152 in the input and output ferrules 144 and 146. As an example, the slotted wheels 68 are mounted on the ferrule drive shafts 62 without regard to the position of the fiber 152 within the ferrules 144 and 146. The positioning of the slots 70 in the wheels 68 to the photodetectors 52 establishes the starting reference points for the fibers 152 in their respective ferrules 144 and 146. The sidewall 38 is secured to the housing 22 and the cavity 32 is filled with an appropriate index matching fluid, such as Norland NOA 61. The top plate 40 is secured to the housing and the switch 20 is ready for the alignment process.

Figure 9:
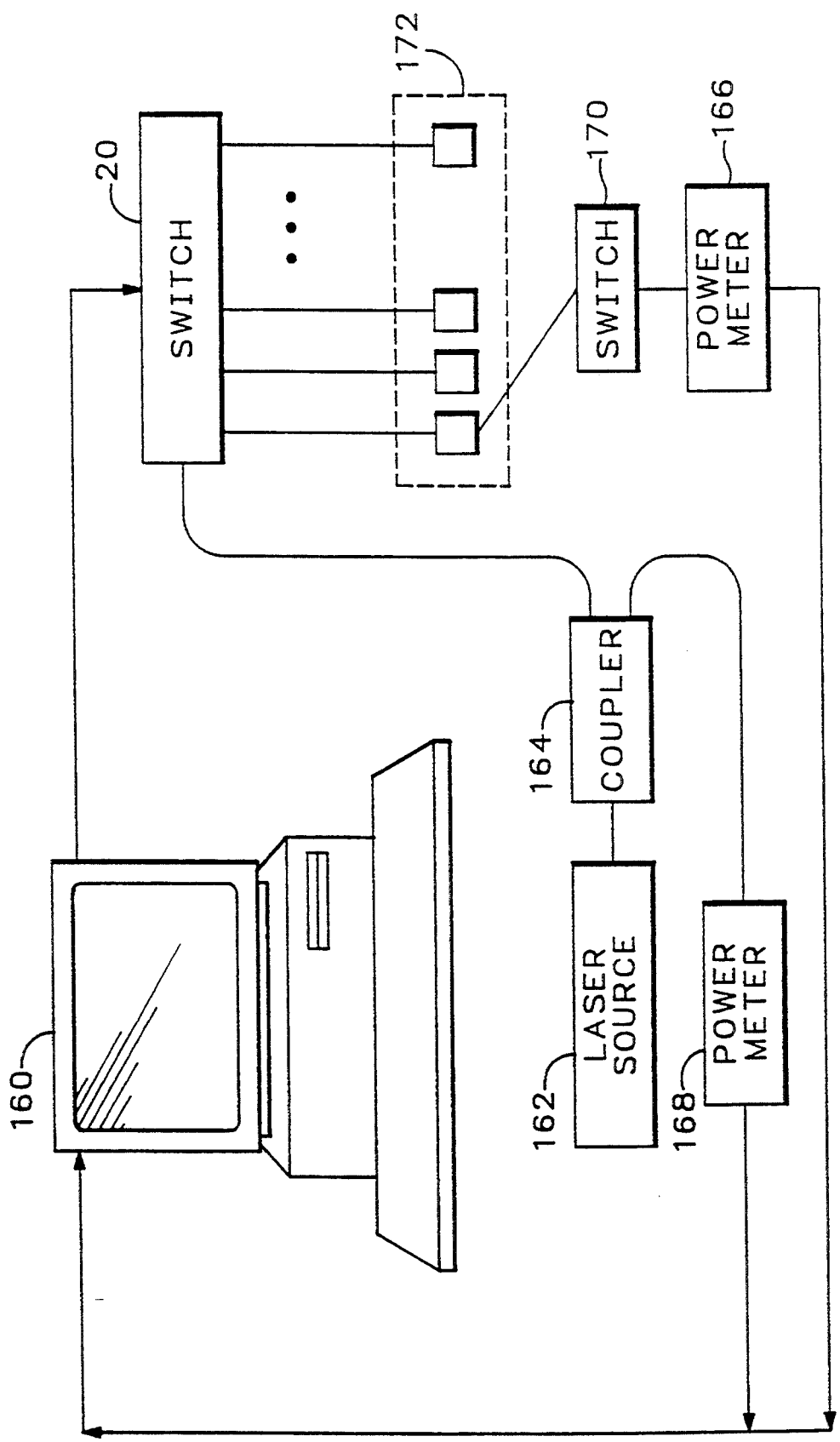
FIG. 9 is a representative alignment fixture for aligning the optical fibers of the input port with the optical fibers of the output port in the mechanical optical switch according to the present invention.

FIG. 9 shows an representative alignment fixture for determining the intersection points of the closed curves of the input optical fibers with the closed curves of the output optical fibers. It should be noted that any fiber 152 lying substantially on the axis of rotation of either of the ferrules 144 or 146 will not move on a closed curve but act as a point. For this reason, any fiber 152 on the axis of rotation of either of the ferrules 144 and 146 will not be used as an optical port. The alignment fixture has a controller 160, such as a computer, a laser source 162, either 1310 nm or 1550 nm, a single-mode coupler 164, two optical power meters 166 and 168, an electronic switch 170 and a bank of photodiodes 172. The computer 160 controls both the optical switch 20 and the electronic switch 170, and records the analog signals from the power meters 166 and 168. The computer locates the angular alignment coordinates of each port on the optical switch 20 by following a procedure as exemplified by the flow chart of FIG. 10. The threshold values in the procedure are not given since they may vary from fixture to fixture based on the laser light source used, the type of photodiodes employed and the type of power meters used.

Figure 11:
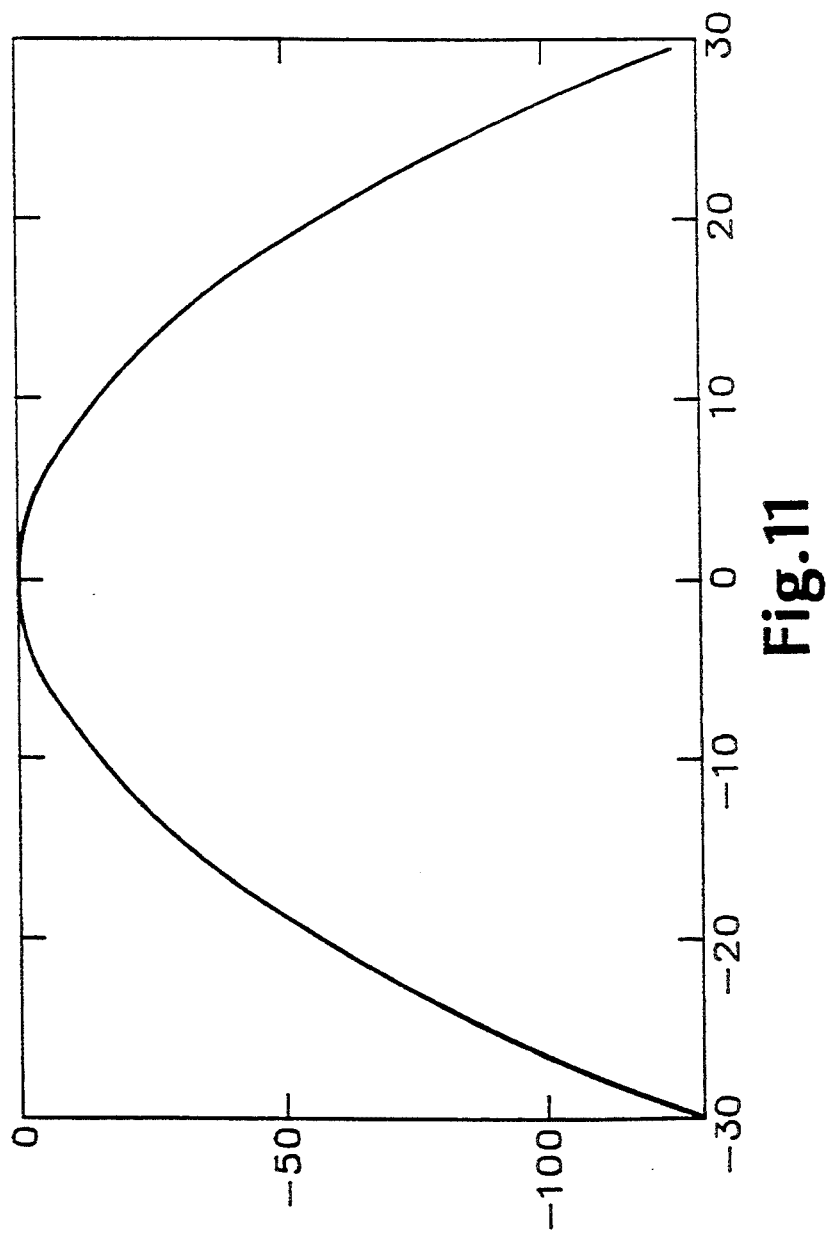
FIG. 11 is a graph representing a mathematical model for coupling between two misaligned optical fibers used in the alignment procedure for the optical ports in the mechanical optical switch according to the present invention.

The basic alignment procedure uses a mathematical model for coupling between two misaligned gaussian beams. This model is generally a good approximation for the optical transmission between misaligned single-mode fibers, since the fundamental modes of these fibers are nearly gaussian. The model assumes the two optical fibers are exactly identical, and that there is no longitudinal or angular misalignment between them. These assumption are valid since the ferrules 144 and 146 are ground and polished prior to installation in the switch 20 and clamp collars 96 are used to maintain the ferrules 144 and 146 in opposing contact. The mathematical model has previously been set forth in equation 1 where T is the optical transmission, x is the lateral offset between the two fibers and w is the $1/e^2$ radius of the irradiance profile of the fundamental mode. FIG. 11 illustrates this function plotted against a logarithmic scale. The function has a single maxima, obtained when the two fibers are exactly coaxial. The procedure locates this maxima by moving the first fiber, and then the second, in such a way as to maximize the optical transmission of the switch.

Figure 10A:
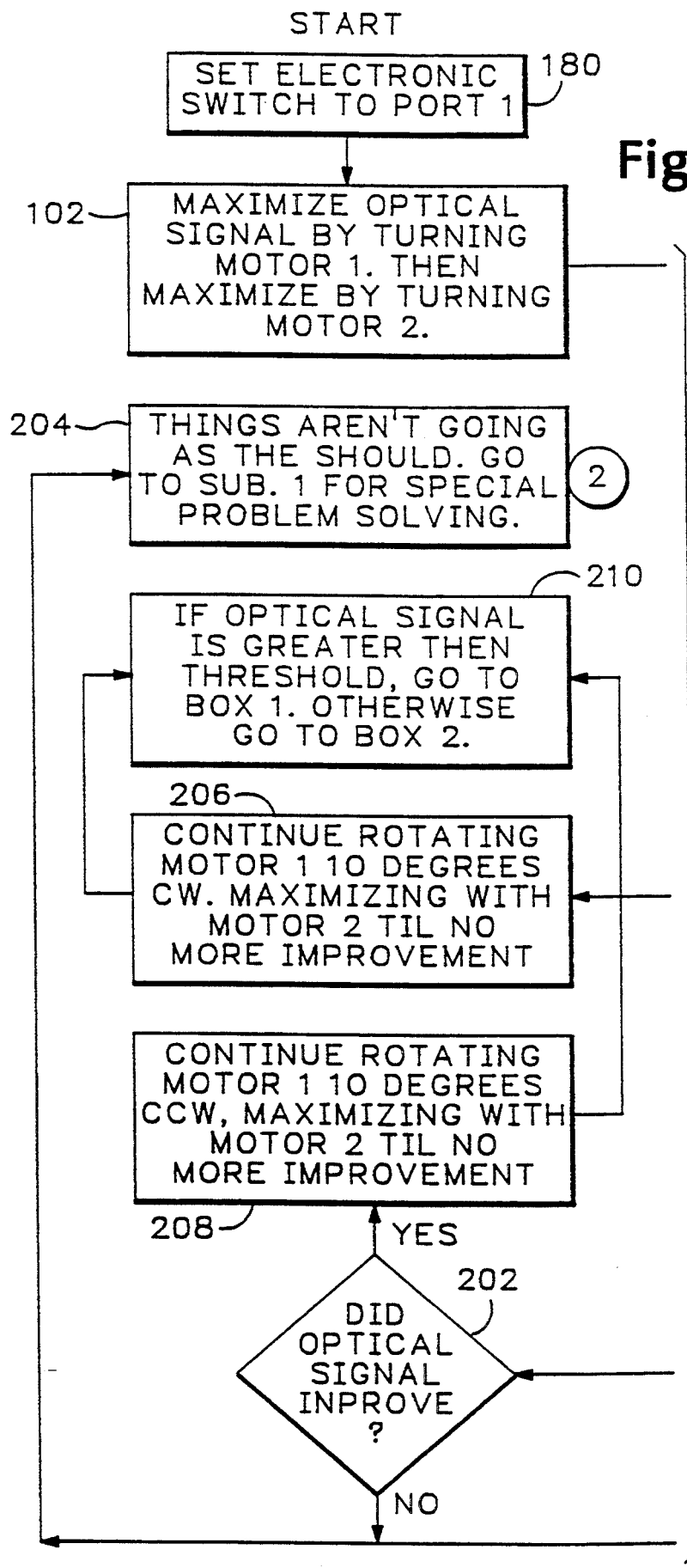
FIG. 10 is a typical flow chart of a procedure for aligning the optical fibers of the input port with the optical fibers of the output port in the mechanical optical switch according to the present invention.
Figure 10B:
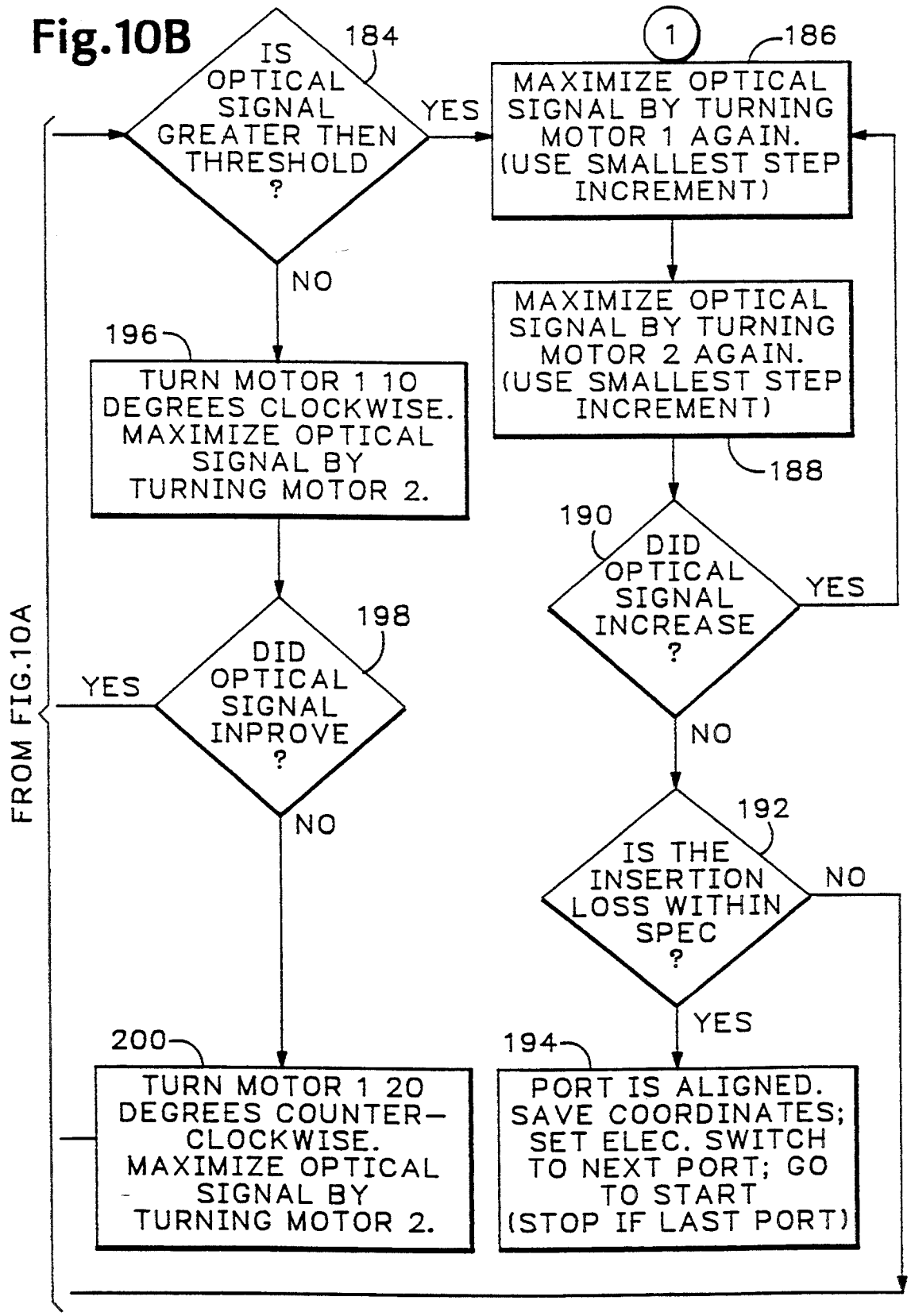

For the smooth curve shown in FIG. 11, the iterative procedure in FIG. 10 steadily converges on the maxima, where the two fibers are in exact alignment. In the real world, however, the curve is lumpy below a certain level, so at low light levels the curve has local maxima that can fool the procedure. These local maxima are much lower, by 20 to 30 dB, than the global maxima, so the procedure must not align to them, or the switch's insertion loss will be to high. This is the reason the procedure makes large steps (either clockwise or counter-clockwise) when the transmission is below some predetermined threshold, which may be called Local Maxima Threshold, or LMT. These small local maxima are generally only a few degrees wide, so by searching with 5 or 10 degree steps the procedure avoids them, finding its way above the LMT, usually within 5 degrees of the global maxima.

Although a preliminary search with large steps greatly diminishes the danger of inadvertently aligning the switch to the local maxima, the procedure is not fool-proof. As an extra precaution, the procedure checks the absolute transmitted power before deciding whether or not the port is properly aligned. If the absolute power is too low, but cannot be improved by adjusting the two motors (using the smallest step increment) then either the switch has a defective component, or it is aligned to a local maxima. If this happens, the procedure employs a special problem solving subroutine, labeled 1 in flow chart of FIG. 10.

The problem solving subroutine will use information about how bad the transmission efficiency is, in order to conduct another search using increments that are larger than the stepper motor's smallest step, but smaller than 10 degrees. It is believed that the LMT can be adjusted so that these types if problems will be very rare, in which case the procedure may simply try to align another port, and leave the difficult ones for an experienced human operator.

When aligning switches with many ports, it may be impractical to try to align the ports sequentially. Instead, it may he simpler to examine each of the output ports, seeing which is closest to the input port by measuring the optical power at each of the photodiodes, and align that one first. After aligning the first port, the procedure could align the next closest port. Generally, this procedure will align the output ports out of sequence, but it will be faster, and the procedure can always re-number the ports after completing the alignment procedure.

The procedure starts with the controller 160 rotating the input and output ferrule drive shafts 62 to their home positions. Their home positions are electrical signals from the photodiodes 52 when the slots 70 of the slotted wheels 68 pass between the light emitting elements and the light receiving elements of the photodiodes. The procedure sets the electronic switch 170 to port 1, box 180, and rotates the input ferrule 144 to maximize the optical signal at the port 1 photodiode 172. The output ferrule 146 is then rotated to maximize the optical signal, box 182. If the optical signal is greater than the thresholds, box 184, then the optical signal is maximized again by sequentially rotating stepper motors 46 for the input and output ferrules 144 and 146 using the smallest step increments, boxes 186 and 188. These steps are repeated until the optical signal no longer increases, box 190. If the insertion loss is within specifications, box 192, then the port is aligned. The number of degrees each stepper motor 46 has turned from their respective home positions are stored in a memory located on the circuit board 42 mounted on the switch 20. The electronic switch 170 is set to the next port and the ferrules 144 and 146 are set to the home position, box 194, where the process is repeated for the next port, box 180.

If the optical signal is less than the threshold after the first motor turning, box 184, then the procedure turns motor 1 10 degrees clockwise and maximizes the optical signal by turning motor 2, box 196. If the optical signal does not improve, motor 1 is turned 20 degrees counter-clockwise and motor 2 is turned to maximize the optical signal, box 200. If the optical signal improves after the 10 degree clockwise rotation or the 20 degree counter-clockwise rotation of motor 1 and the maximizing of the optical signal by turning motor 2, boxes 198 and 202, then the routine continues in the appropriate direction with maximizing the optical signal with motor 2, boxes 204 and 206. If the optical signal is greater than the threshold after this process, then the routine jumps to that portion of the procedure where motor 1 and 2 are turned using the smallest increment, boxes 186 and 188. If the optical signal is greater than the insertion loss, box 192, then the port is aligned, box 194, otherwise the routine jumps to the special problem solving routine, box 186. If after the clockwise and counter-clockwise rotations of the motors, the optical signal is less than the threshold, box 210, then the routine jumps to the special problem solving subroutine, box 186.

The procedure of FIG. 10 is designed to find one of the two intersecting points on the closed curves of the input and output optical fiber defining optical ports. The procedure could easily be modified to find both intersection points. This would be advantageous for faster switching between ports of the optical switch 20 in that the closest intersecting point of the designated ports could be more quickly accessed. Further, the procedure just described assumes a blind search, that is nothing is known about the locations of the fibers 152 within the ferrules 144 and 146. This may not necessarily be the case. With experience, the approximate rotational distance between adjacent fibers can be determined based on the size of the ferrules, the number of fibers in the ferrules and the size of the fibers. Based on this acquired knowledge, the procedure may be modified to automatically rotate a certain number of degrees after a port is aligned to start the alignment procedure for the next port.

A further embodiment of the mechanical optical switch 20 is to add a photodiode within the switch 20 proximate to the interface between the input and output fiber arrays 148 and 150. The photodiode monitors the amount of light scattered near the optical interface between the arrays 148 and 150 and generates an electrical output as a function of the misalignment of the various ports of the switch 20. A minimum electrical signal from the photodiode indicates the maximum alignment between the selected input and output ports. Including the photodiode in the mechanical optical switch 20 permits active alignment of the ports after it has been put in use. This can extend the useful life of the switch 20.

Having aligned the ports of the switch 20, it is now usable in remote fiber test systems. It is envisioned that such systems are part of a central office system of a telecommunications company. The input ports of the switch 20 would be connected to various pieces of optical test equipment, such as optical time domain reflectometers having different interrogating wavelengths of light, optical power meters, or the like. The output ports of the switch are connected to various optical fiber lines carrying telecommunications signals. A central office computer passes commands to the switch 20 over a bus for connecting a particular input port to a particular output port. The electronic circuitry on the switch 20 interprets the command and accesses the stored coordinate positions for the selected ports and rotates each port to the intersection point on the closed curves of the ports.

The mechanical optical switch 20 of the present invention has been described using electrical stepper motors 46 for rotating input and output ferrules 144 and 146 to align the optical fibers 152 in the input and output optical fiber arrays 148 and 150 representing the input and output optical ports of the switch. It is also possible to practice the present invention using manual means for aligning the input and output optical ports. In such a switch, the stepper motors 46 and the toothed spur gears 48 are replaced with reduction gear assemblies. The reduction gear assemblies engage the ferrules drive shaft spur gears 72 on the ferrule drive shafts 62. A knob is provided for manually rotating the gear assembly and hence the ferrules 144 and 146 in the switch 20. Detents can be provided with the gear assembly to indicate alignment locations of the input and output ports. Alternately, alignment may be achieved by monitoring the appropriate output port for a maximum optical signal.

A mechanical optical switch has been described that meets cycle-to-cycle repeatability, long-term repeatability, and absolute misalignment specifications. The switch is inexpensive and easy to manufacture. The switch has offset ferrules that rotate about independent axes with the ferrules being held independently in separate three-point kinematically correct mounts, such as V-blocks. The V-blocks are lined with a wear-resistant material, such as glass or ceramic and lubricated with an index matching fluid. Offsetting the ferrules and mounting then in kinematically correct mounts allows the fibers held within the ferrules to trace out closed curves with the closed curves of the fibers in the input ferrule intersecting the closed curves of the fibers in the output ferrules. The input ferrule and the output ferrule are fully filled with fibers with all the fibers being accessible as ports with the exception of the fibers centered on the axes of the ferrules. These and other aspects of the present invention are set forth in the appended claims.

What is claimed is:

1. An optical switch comprising:

at least a first optical transmission path rotating about a first independent and offset rotational axis for positioning the first optical transmission path on a first closed curve;

at least a second optical transmission path rotating about a second independent and offset rotational axis for positioning the second optical transmission path on a second closed curve, the first and second optical transmission paths being in opposing relationship forming an optical interface, with the closed curves of the optical transmission paths being laterally offset from each other for establishing intersecting points on the closed curves;

first and second mounting members for holding the respective first and second optical transmission paths with the first mounting member having a rotational axis axially aligned with the first independent and offer rotational axes and the second mounting member having a rotational axis axially aligned with the second independent and offset rotational axis, the first and second optical transmission paths being positioned off of the respective rotational axes of the mounting members;

means for storing angular coordinates representative of the intersecting points of the first and second closed curves of the respective first and second optical transmission paths; and means for axially aligning the first and second optical transmission paths at one of the intersecting points on the closed curves, drive motors coupled to the respective mounting members and responsive to the angular coordinates for selectively rotating the first and second optical transmissions paths relative to each other about their respective independent and offset rotational axes.

2. The optical switch as recited in claim 1 further comprising a plurality of optical transmission paths rotating about the first independent and offset rotational axis for positioning the plurality of optical transmission paths on closed curves for establishing intersecting points between the closed curves of the plurality of optical transmission paths rotating about the first independent and offset rotational axis and the second optical transmission path rotating about the second independent and offset rotational axis.

3. The optical switch as recited in claim 1 further comprising means for monitoring scattered light at the optical interface between the axially aligned first and second optical transmission paths from an optical signal coupled between the transmission paths for producing an electrical signal representative of axial misalignment between the first and second optical transmission paths.

4. The optical switch as recited in claim 3 wherein the monitoring means comprises a photodiode.

5. The optical switch as recited in claim 1 further comprising a plurality of optical transmission paths rotating about the second independent and offset rotational axis for positioning the plurality of optical transmission paths on closed curves for establishing intersecting points between the closed curves of the plurality of optical transmission paths rotating about the second independent and offset rotational axis and the closed curve of the first optical transmission path.

6. The optical switch as recited in claim 1 further comprising a first and a second plurality of optical transmission paths with the first plurality of optical transmission paths rotating about the first independent and offset rotational axis for positioning the first plurality of optical transmission paths on cloyed curves and the second plurality of optical transmission oaths rotating about the second independent and offset rotational axis for positioning the second plurality of optical transmission paths on closed curves for establishing at least intersecting point between each of the closed curves of the plurality of optical transmission paths rotating about the second independent and offset rotational axis and one of the closed curves of the plurality of optical transmission paths rotating about the first independent and offset rotational axis.

7. The optical switch as recited in claim 1 further comprising holder assemblies with each holder assembly having a kinematic mount for receiving one of the mounting members.

8. The optical switch as recited in claim 7 wherein each kinematic mount comprises a V-groove structure having an apex and angularly extending sidewalls forming a V-shaped cavity for receiving one of the mounting members and a spring clamp positioned over the V-shaped cavity for securing the mounting member in the cavity.

9. The optical switch as recited in claim 8 wherein the V-groove structures and the mounting members are formed from materials having substantially the same hardness.

10. The optical switch as recited in claim 9 wherein the mounting members and the V-groove structures are a borosilicate material.

11. The optical switch as recited in claim 8 wherein the V-groove structures are formed from materials having a hardness greater than the hardness of the mounting members.

12. The optical switch as recited in claim 8 wherein the V-groove structures further comprise wear resistant inserts secured on the sidewalls of the V-groove structures.

13. The optical switch as recited in claim 12 wherein the inserts further comprise wear resistant strips bonded to the opposing ends of the sidewalls for forming a double ended bearing for the mounting members.

14. The optical switch as recited in claim 13 wherein the spring clamp further comprises first and second spring clamp members positioned over each bearing of the double ended bearing for securing the mounting member in the V-shaped cavity.

15. The optical switch as recited in claim 12 wherein the mounting members and the inserts are formed from a borosilicate material having substantially the same hardness.

16. The optical switch as recited in claim 12 wherein the inserts are formed from materials having a hardness greater than the harness of the mounting members.

17. The optical switch as recited in claim 1 wherein the mounting members comprise ferrules with each ferrule having a centrally disposed longitudinal axis about which the ferrule rotates, an outside diameter and a central bore for receiving one of the first or second optical transmission paths, the optical transmission paths being positioned off of the axes of rotation of the ferrules.

18. The optical switch as recited in claim 17 wherein the first and second optical transmission paths comprise optical fibers.

19. The optical switch as recited in claim 18 further comprising a plurality of optical fibers rotating about the second independent and offset rotational axis for positioning the plurality of optical fibers on closed curves for establishing intersecting points between the closed curves of the plurality of optical fibers rotating about the second independent and offset rotational axis and the closed curve of the first optical fiber.

20. The optical switch as recited in claim 19 wherein the plurality of optical fibers rotating about the second independent and offset rotational axis completely fill the ferrule.

21. The optical switch as recited in claim 18 further comprising a first and a second plurality of optical fibers with the first plurality of optical fibers rotating about the first independent and offset rotational axis for positioning the plurality of optical fibers on closed curves and the second plurality of optical fibers rotating about the and independent and offset rotational axis for positioning the plurality of optical fibers on closed curves for establishing at least one intersecting point between each of the closed curves of the plurality of optical fibers rotating about the second independent and offset rotational axis and one of the closed curves of the plurality of optical fibers rotating about the first independent and offset rotational axis.

22. The optical switch as recited in claim 21 wherein the plurality of optical fibers rotating about the first independent and offset rotational axis completely fill the ferrule.

23. The optical switch as recited in claim 18 comprising a plurality of optical fibers rotating about the first independent and offset rotational axis for positioning the plurality of optical fibers on closed curves for establishing intersecting points between the closed curves of the plurality of optical fibers rotating about the first independent and offset rotational axis and the closed curve of the second optical fiber rotating about the second independent and offset rotational axis.

24. The optical switch as recited in claim 1 wherein the drive motors comprise first and second stepper motors responsive to the angular coordinates of one of the intersecting points of the first and second closed curves for coupling rotational movement to the respective first and second optical transmission paths.

25. The optical switch as recited in claim 1 wherein the drive motor comprise first and second DC motors with high resolution encoders responsive to the angular coordinates of one of the intersecting points of the first and second closed curves for coupling rotational movement to the respective first and second optical transmission paths.

26. The optical switch as recited in claim 1 further comprising first and second rotatable shafts coupled to the respective mounting members with each rotatable shaft having a first spur gear mounted thereon for engaging a second spur gear mounted on each of the respective drive motors.

27. The optical switch as recited in claim 26 further comprising first and second bearings having central bores therein for receiving the rotatable shafts.

28. The optical switch as recited in claim 27 wherein the rotatable shafts further comprise a first shaft having a central bore for receiving the respective first and second optical transmission paths and a flexible drive shaft coupling for connecting the first shaft to the respective mounting members.

29. An optical switch comprising:
 at least a first optical fiber disposed within a first mounting member rotating about a first independent rotational axis with the first optical fiber positioned within the mounting member to move on a first closed curve;

at least a second optical fiber disposed within a second mounting member rotating about a second rotational axis with the second optical fiber positioned within the mounting member to move on a second closed curve, the first and second optical fibers being in opposing relationship forming an optical interface, with the first and second rotational axes being laterally offset from each other for offsetting the first and second closed curves of the optical fibers for establishing intersecting points on the closed curves;

means for storing angular coordinates representative of the intersecting points of the first and second closed curves of the respective first and second optical fibers; and means for axially aligning the first and second optical fibers at one of the intersecting points on the closed curves, drive motors coupled to the respective mounting members and responsive to the angular coordinates for selectively rotating the first and second optical transmissions paths relative to each other about their respective independent and offset rotational axes.

30. The optical switch as recited in claim 29 further comprising a plurality of optical fibers disposed within the first mounting member rotating about the first independent and offset rotational axis for establishing intersecting points between the closed curves of the plurality of optical fibers within the first mounting member and the closed curve of the second optical fiber within the second mounting member.

31. The optical switch as recited in claim 29 further comprising means for monitoring scattered light at the optical interface between the axially aligned first and second optical transmission paths from an optical signal coupled between the transmission paths for producing an electrical signal representative of axial misalignment between the first and second optical transmission paths.

32. The optical switch as recited in claim 31 wherein the monitoring means comprises a photodiode.

33. The optical switch as recited in claim 29 further comprising a plurality of optical fibers disposed within the second mounting member with the plurality of optical fibers within the second mounting member rotating about the second independent and offset rotational axis for establishing intersecting points between the closed curves of the plurality of optical fibers within the second mounting member and the closed curve of the first optical fiber.

34. The optical switch as recited in claim 29 further comprising a first and a second plurality of optical fibers with the first plurality of optical fibers disposed within the first mounting member and rotating about the first independent and offset rotational axis and the second plurality of optical fibers disposed within the second mounting member and rotating about the second independent and offer rotational axis for establishing at least one intersecting point between each of the closed curves of the plurality of optical fibers within the first mounting member and one of the closed curves of the plurality of optical fibers within the second mounting member.

35. The optical switch as recited in claim 29 further comprising holder assemblies with each holder assembly having a kinematic mount for receiving one of the mounting members.

36. The optical switch as recited in claim 35 wherein each kinematic mount comprises a V-groove structure having an apex and angularly extending sidewalls forming a V-shaped cavity for receiving one of the mounting members and a spring clamp positioned over the V-shaped cavity for securing the mounting member in the cavity, 37. The optical switch as recited in claim 36 wherein the V-groove structures and the mounting members are formed from materials having substantially the same hardness.

38. The optical switch as recited in claim 37 wherein the mounting members and the V-groove structures are a borosilicate material.

39. The optical switch as recited in claim 36 wherein the V-groove structures are formed from materials having a hardness greater than the hardness of the mounting members.

40. The optical switch as recited in claim 36 wherein the V-groove structures further comprise wear resistant inserts secured on the sidewalls of the V-groove structures.

41. The optical switch as recited in claim 40 wherein the inserts further comprise wear resistant strips bonded to the opposing ends of the sidewalls for forming a double ended bearing for the mounting members.

42. The optical switch as recited in claim 41 wherein the spring clamp further comprises first and second spring clamp members positioned over each bearing of the double ended bearing for securing the mounting member in the V-shaped cavity.

43. The optical switch as recited in claim 40 wherein the mounting members and the inserts are formed from a borosilicate material having substantially the same hardness.

44. The optical switch as recited in claim 40 wherein the inserts are formed from materials having a hardness greater than the harness of the mounting members.

45. The optical switch as recited in claim 29 wherein the first and second mounting members comprise first and second ferrules with each ferrule having a centrally disposed longitudinal axis about which the ferrule rotates, an outside diameter and a central bore for receiving the respective first or second optical fibers, the optical fibers being positioned off of the axes of rotation of the ferrules.

46. The optical switch as recited in claim 45 further comprising a plurality of optical fibers completely filling the second ferrule with the plurality of optical fibers rotating about the second independent and offset rotational axis for establishing intersecting points between the closed curves of the plurality of optical fibers filing the second ferrule and the closed curve of the first optical fiber.

47. The optical switch as recited in claim 45 further comprising a first and second plurality of optical fibers with the first plurality of optical fibers completely filling the first ferrule and rotating about the first independent and offset rotational axis and the second plurality of optical fibers completely filling the second ferrule and rotating about the second independent and offset rotational axis for establishing at least one intersecting point between each of the closed curves of the second plurality of optical fibers filling the second ferrule and one of the closed curve of the first plurality of optical fibers filling the first ferrule.

48. The optical switch as recited in claim 45 further comprising a plurality of optical fibers completely filling the first ferrule with the plurality of optical fibers rotating about the first independent and offset rotational axis for establishing intersecting points between the closed curves of the plurality of optical fibers filing the first ferrule and the closed curve of the second optical fiber.

49. The optical switch as recited in claim 29 wherein the drive motors comprises first and second stepper motors responsive to the angular coordinates of one of the intersecting points of the first and second closed curves for coupling rotational movement to the respective first and second optical fibers.

50. The optical switch as recited in claim 29 wherein the drive motors comprises first and second DC motors with high resolution encoders responsive to the angular coordinates of one of the intersecting points of the first and second closed curves for coupling rotational movement to the respective first and second optical fibers.

51. The optical switch as recited in claim 29 further comprising first and second rotatable shafts coupled to the respective mounting members with each rotatable shaft having a first spur gear mounted thereon for engaging a second spur gear mounted on each of the respective drive motors.

52. The optical switch as recited in claim 51 further comprising first and second bearings having central bores therein for receiving the rotatable shafts.

53. The optical switch as recited in claim 52 wherein the rotatable shafts further comprise a first shaft having a central bore for receiving the respective first and second optical fibers and a flexible drive shaft coupling for connecting the first shaft to the respective mounting members.

54. An optical switch comprising:
a first optical fiber disposed within a first ferrule rotating about a first independent rotational axis with the first optical fiber positioned within the ferrule to move on a first closed curve;
a plurality of optical fiber disposed within a second ferrule rotating about a second rotational axis with the plurality of second optical fibers positioned within the ferrule to move on second closed curves, the first optical fiber and the plurality of second optical fibers being in opposing relationship forming an optical interface, with the first and second rotational axes being laterally offset from each other for offsetting the closed curve of the first optical fiber from the closed curves of the plurality of second optical fibers for establishing intersecting points between the closed curve of the first optical fiber and the closed curves of the plurality of second optical fibers;
first and second offset holder assemblies for receiving the first and second ferrules with each holder assembly having a kinematic V-groove structure with an apex and angularly extending sidewalls forming a V-shaped cavity for receiving the respective ferrules and a spring clamp positioned over the V-shaped cavity for securing the ferrule in the cavity, the V-groove structure and the ferrules having substantially the same hardness;
means for storing angular coordinates representative of the intersecting points between the closed curve of the first optical fiber and the closed curves of the plurality of second optical fibers; and
means for selectively rotating the first optical fiber and the plurality of second optical fibers relative to each other about their respective independent and offset rotational axes for axially aligning the first optical fiber with each of the plurality of second optical fibers at one of the intersecting points on the closed curves.

55. The optical switch as recited in claim 54 further comprising means for monitoring scattered light at the optical interface between the axially aligned first and second optical transmission paths from an optical signal coupled between the transmission paths for producing an electrical signal representative of axial misalignment between the first and second optical transmission paths.

56. The optical switch as recited in claim 55 wherein the monitoring means comprises a photodiode.

57. The optical switch as recited in claim 54 wherein the plurality of optical fibers completely fill the second ferrule.

58. The optical switch as recited in claim 54 further comprising a plurality of optical fibers disposed within the first ferrule with the plurality of optical fibers rotating about the first independent rotational axis for establishing at least one intersecting point between each the closed curves of the plurality of optical fibers disposed within the second ferrule and one of the closed curves of the plurality of optical fiber disposed within the first ferrule.

59. The optical switch as recited in claim 58 wherein the plurality of optical fibers disposed within the first ferrule completely fill the first ferrule.

60. The optical switch as recited in claim 54 wherein the V-groove structures further comprise wear resistant inserts secured on the sidewalls of the V-groove structures.

61. The optical switch as recited in claim 60 wherein the inserts further comprise wear resistant strips bonded to the opposing ends of the sidewalls for forming a double ended bearing for the mounting members.

62. The optical switch as recited in claim 61 wherein the spring clamp further comprises first and second spring clamp members positioned over each bearing of the double ended bearing for securing the mounting member in the V-shaped cavity.

63. The optical switch as recited in claim 60 wherein the mounting members and the inserts are formed from a borosilicate material having substantially the same hardness.

64. The optical switch as recited in claim 54 wherein the rotating means comprises first and second manually rotatable reduction gear assemblies coupled to transmit rotational movement to the respective first and second optical fibers.

65. The optical switch as recited in claim 54 wherein the rotating means comprises first and second stepper motors responsive to the angular coordinates of one of the intersecting points of the first and second closed curves for coupling rotational movement to the respective first and second optical fibers.

66. The optical switch as recited in claim 54 wherein the rotating means comprises first and second DC motors with high resolution encoders responsive to the angular coordinates of one of the intersecting points of the first and second closed curves for coupling rotational movement to the respective first and second optical fibers.

67. The optical switch as recited in claim 54 wherein the rotating means further comprises rotatable shafts coupled to each of the mounting members with each rotatable shaft having a first spur gear mounted thereon for engaging a second spur gear mounted on the rotating means.

68. The optical switch as recited in claim 67 further comprising first and second bearings having central bores therein for receiving the rotatable shafts.

69. The optical switch as recited in claim 68 wherein the rotatable shafts further comprise a first shaft having a central bore for receiving the respective first and second optical fibers and a flexible drive shaft coupling for connecting the first shaft to the respective mounting members.

* * * * *